US012671725B2

(12) United States Patent
Hu et al.

(10) Patent No.: US 12,671,725 B2
(45) Date of Patent: Jun. 30, 2026

(54) PEER TO PEER COMMUNICATION OF A REMOTE DISPLAY PROTOCOL VIA A REAL-TIME COMMUNICATION SESSION

(71) Applicant: Omnissa, LLC, Mountain View, CA (US)

(72) Inventors: Jinxing Hu, Beijing (CN); Kushal Bhandari, Newark, CA (US); Yueting Zhang, Beijing (CN); Tong Zhao, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 316 days.

(21) Appl. No.: 18/476,819

(22) Filed: Sep. 28, 2023

(65) Prior Publication Data
US 2025/0030752 A1      Jan. 23, 2025

(51) Int. Cl.
*H04L 65/1093*      (2022.01)
*H04L 65/1108*      (2022.01)
*H04L 65/80*      (2022.01)

(52) U.S. Cl.
CPC ...... *H04L 65/1093* (2013.01); *H04L 65/1108* (2022.05); *H04L 65/80* (2013.01)

(58) Field of Classification Search
CPC ... H04L 65/1093; H04L 65/1108; H04L 65/80
See application file for complete search history.

(56) References Cited

U.S. PATENT DOCUMENTS

| 2012/0084713 A1* | 4/2012 | Desai | ..................... G06F 9/452 |
| | | | 715/788 |
| 2013/0326081 A1* | 12/2013 | Katz | ................... H04L 63/0272 |
| | | | 709/231 |
| 2015/0029296 A1* | 1/2015 | Ni | .......................... H04N 7/148 |
| | | | 348/14.01 |

* cited by examiner

*Primary Examiner* — Yosef K Laekemariam
(74) *Attorney, Agent, or Firm* — Kim & Stewart LLP

(57) ABSTRACT

The disclosure provides techniques for peer to peer communication of a remote display protocol via a real-time communication session between a client device and a remote device. Embodiments include receiving, at a remote device configured to execute a virtual desktop, a request to join a real-time communication (RTC) session with a client device. Embodiments include joining the RTC session with the client device in response to receiving the request. Embodiments include receiving, at the remote device and via the RTC session, data indicative of a remote display protocol for rendering the virtual desktop on a display of the client device. Embodiments include performing, at the remote device, one or more actions based, at least in part, on receiving the data indicative of the remote display protocol.

17 Claims, 5 Drawing Sheets

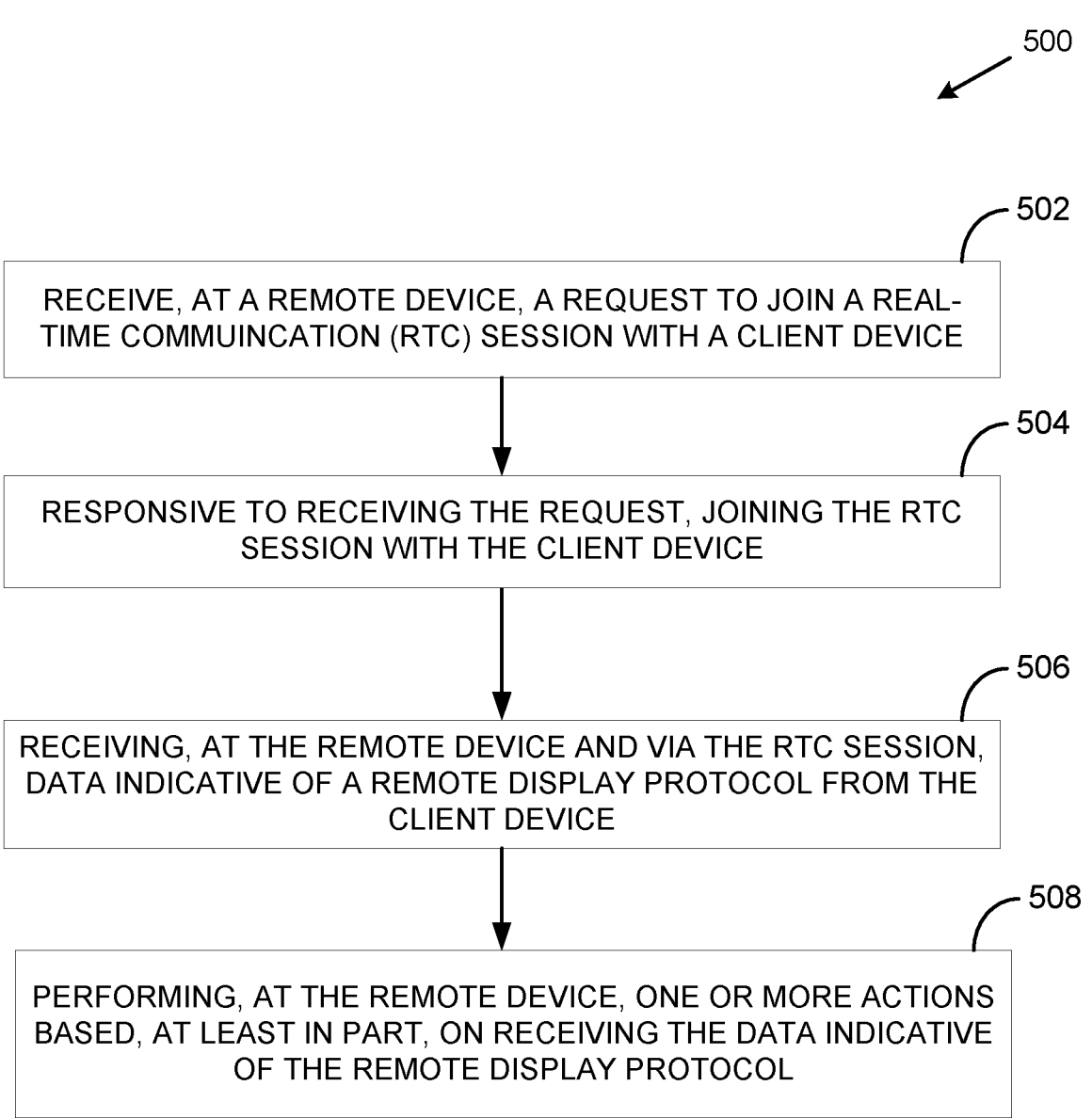

500

502

RECEIVE, AT A REMOTE DEVICE, A REQUEST TO JOIN A REAL-TIME COMMUINCATION (RTC) SESSION WITH A CLIENT DEVICE

504

RESPONSIVE TO RECEIVING THE REQUEST, JOINING THE RTC SESSION WITH THE CLIENT DEVICE

506

RECEIVING, AT THE REMOTE DEVICE AND VIA THE RTC SESSION, DATA INDICATIVE OF A REMOTE DISPLAY PROTOCOL FROM THE CLIENT DEVICE

508

PERFORMING, AT THE REMOTE DEVICE, ONE OR MORE ACTIONS BASED, AT LEAST IN PART, ON RECEIVING THE DATA INDICATIVE OF THE REMOTE DISPLAY PROTOCOL

FIG. 5

PEER TO PEER COMMUNICATION OF A REMOTE DISPLAY PROTOCOL VIA A REAL-TIME COMMUNICATION SESSION

CROSS-REFERENCE TO RELATED APPLICATIONS

This application claims priority to International Patent Application No. PCT/CN/2023/108292, filed Jul. 20, 2023, entitled "PEER TO PEER COMMUNICATION OF A REMOTE DISPLAY PROTOCOL VIA A REAL-TIME COMMUNICATION SESSION", and assigned to the assignee hereof, the contents of each of which are hereby incorporated by reference in its entirety.

BACKGROUND

In a virtual desktop infrastructure (VDI) environment, a client device may access and display a remote virtual or physical desktop or remote application that is running on a remote device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse, pen, etc.) associated with the client device, and operating system (OS) events generated based on the user's inputs may be redirected from the client device to the remote device on which the virtual desktop is actually running.

The client device may communicate with the remote device through a unified access gateway. For instance, the unified access gateway may receive data (e.g., user inputs) from the client device and may communicate the data to the remote device. Likewise, the unified access gateway may receive data (e.g., updated stream of virtual desktop based on user inputs) and may communicate the data to the client device. However, routing communications through the unified access gateway may cause a delay (e.g, lag) between the client device receiving input from the user and the client device receiving an updated stream of the virtual desktop from the remote device that is based on the input.

Accordingly, there is a need in the art for improved communications between the client device and the remote device on which the virtual desktop is actually running.

SUMMARY

A method is provided that includes: receiving, at a remote device configured to execute a virtual desktop, a request to join a real-time communication session with a client device; responsive to receiving the request, joining the real-time communication session with the client device; receiving, at the remote device and via the real-time communication session, data indicative of a remote display protocol for rendering the virtual desktop on a display of the client device; and performing, at the remote device, one or more actions based, at least in part, on receiving the data indicative of the remote display protocol.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

FIG. 5 depicts example operations related to device redirection in a remote computing environment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
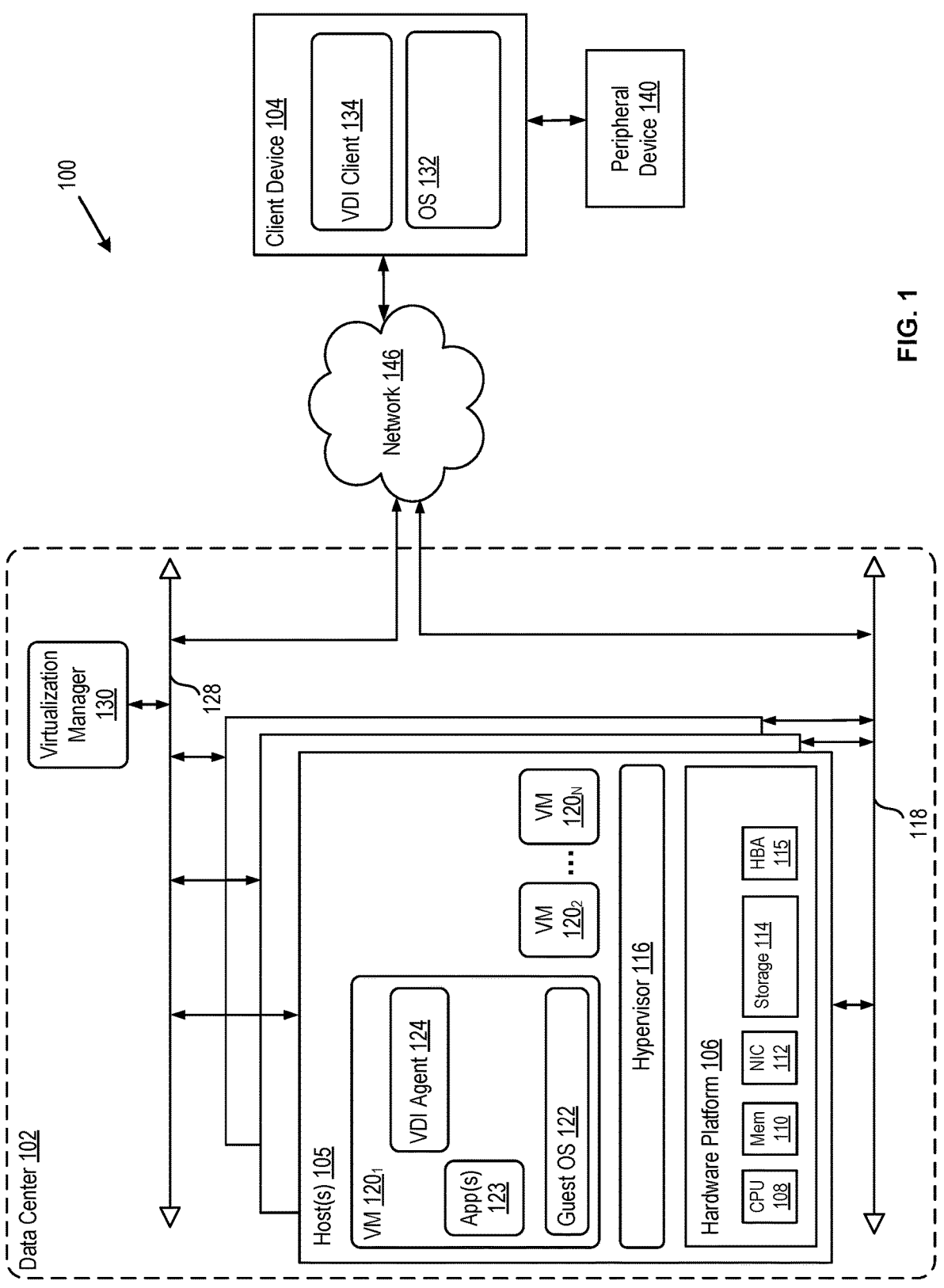
FIG. 1 depicts a block diagram of a virtualized desktop infrastructure system in which one or more embodiments according to the present disclosure may be implemented.

The present disclosure is directed to peer to peer communication between a client device and a remote device configured to execute (e.g., run) a virtual desktop. The client device and the remote device may be connected to one another via a real-time communication (RTC) session that is based on a RTC protocol, such as WebRTC. When the client device and the remote device are connected via the RTC session, the client device may communicate data indicative of a remote display protocol to the remote device. More specifically, the client device may communicate the data over a data channel associated with the RTC protocol on which the RTC session is based. Upon receiving the data indicative of the remote display protocol, the remote device may communicate data (e.g, a stream of the virtual desktop) to the client device via the data channel and according to the remote display protocol.

In some embodiments, the remote device may obtain data indicative of performance of the RTC session. For example, the data indicative of the performance may include, without limitation, at least one of round trip time, fraction lost, or bandwidth estimation. Round trip time may refer to an amount of time it takes from the moment a request is sent until a response is received. Fraction lost may refer to a ratio (e.g., percentage) of data packets that are lost to the total number of data packets that are transmitted for a period of time. The remote device may be configured to adjust one or more parameters (e.g., image resolution, maximum number of frames per second) of the remote display protocol based, at least in part, on the data indicative of performance of the RTC session.

The present disclosure may provide numerous technical effects and benefits. For instance, connecting the client device and the remote device via the RTC session that is based on the RTC protocol eliminates the need for routing communications through a universal access gateway, thereby improving efficiency of communications between the client device and the remote device and avoiding lag that would otherwise be introduced by routing communications through a universal access gateway. As such, embodiments of the present disclosure improve the functioning of the computing devices involved by allowing input from the user via the client device to be received and processed by the remote device more quickly and by allowing the client device to more quickly receive an updated stream of the virtual desktop from the remote device that is based on the input. Furthermore, the remote device can leverage data indicative of performance of the RTC session (e.g, round trip time, fraction lost, bandwidth estimation) to adjust one or more parameters of the remote display protocol. For instance, if the estimated bandwidth of the RTC session is below a threshold value, the remote device may adjust one or more parameters of the remote display protocol as needed to minimize a degradation in quality of the stream of the virtual desktop as displayed on the client device.

FIG. 1 depicts a block diagram of a virtualized desktop infrastructure (VDI) system 100 in which one or more embodiments according to the present disclosure may be implemented. The VDI system 100 includes at least one client device 104 and a data center 102 that are connected by a network 146. The network 146 may be, for example, a direct link, a local area network (LAN), a wide area network (WAN) such as the Internet, another type of network, or a combination of these.

The client device 104 may be a physical device, such as a general purpose desktop computer or mobile computer. A mobile computer may be, for example, a laptop, a mobile phone, or a tablet computer. The client device 104 may include a VDI client 134, and an operating system (OS) 132. In some embodiments, the VDI client 134 may run on top of the OS 132, which may be a standard, commodity operating system.

The VDI client 134 is a user-side interface of a virtualized desktop running on one of virtual machines (VMs) 120. Though certain aspects are described herein with respect to a virtual desktop running on a VM, the techniques may similarly be used for a virtual desktop or application running on other types of VDIs, such as containers, or on physical computing devices. As used herein, a "virtualized desktop" or "remote desktop" is a desktop running on, for example, one of VMs 120 that is displayed remotely on the client device 104, as though the remote desktop were running on the client device 104. By opening the VDI client 134, a user of the client device 104 may access, through the network 146, a remote desktop running in a remote data center 102, from any location, using the client device 104. Frames of the remote desktop running on one of the VMs 120 are transmitted to the VDI client 134 using a desktop delivery protocol such as VMware® Blast™, or Microsoft® Remote Desktop Protocol (RDP)™.

After transmission, the frames are displayed on the client device 104 for interaction by the user. The client device 104 may send user inputs to the VM 120 for processing on the VM 120 of the data center 102, taking processing load off the client device 104. Such centralized and automated management of remote desktops provides increased control and cost savings. The VDI client 134 may be, for example, VMware® View™, or a special purpose thin client such as those available from Dell, HP, NEC, Sun Microsystems, Wyse, and others.

The data center 102 includes host(s) 105, a virtualization manager 130, a management network 128, and a data network 118. Although the management and data network are shown as separate physical networks, it is also possible in some implementations to logically isolate the management network from the data network using different VLAN identifiers. Each of the hosts 105 may be constructed on a server grade hardware platform 106, such as an x86 architecture platform. For example, the hosts 105 may be geographically co-located servers on the same rack.

The host(s) 105 are configured to provide a virtualization layer, also referred to as a hypervisor 116, that abstracts processor, memory, storage, and networking resources of hardware platform 106 into multiple VMs 1201 to 120N (collectively referred to as VMs 120 and individually referred to as VM 120) that run concurrently on the same host. The hypervisor 116 may run on top of the operating system in host(s) 105. In some embodiments, the hypervisor 116 can be installed as system level software directly on the hardware platform 106 of the host(s) 105 (often referred to as "bare metal" installation) and be conceptually interposed between the physical hardware and the guest operating systems executing in the virtual machines. In some implementations, the hypervisor 116 may include system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. One example of the hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123, and a VDI agent 124. The application(s) 123 and the VDI agent 124 may run on top of the guest OS 122 which, in some embodiments, may be a standard, commodity operating system. It should be appreciated that the application(s) 123 may be any software program, such as a word processing program.

The VDI agent 124 may be a desktop virtualization program that connects to the VDI client 134 of the client device 104, through the network 146. The connection between the VDI agent 124 and the VDI client 134 may be authenticated, such as through a username and password combination pertaining to client device 104 or to a user of client device 104. The VDI agent 124 may transmit, to the VDI client 134, one or more image frames of the remote desktop running on VM 120 that contains the VDI agent 124. The image frame(s) may include information (e.g., pixel color, location information) on appearance of the remote desktop running on VM 120. In addition to the image frame(s), the VDI agent 124 may also transmit metadata of that frame to the VDI client 134. The metadata may include x and y coordinate locations of a mouse cursor, x and y coordinates and size of windows of the application(s) 123 open on the remote desktop, which of the application(s) 123 are running on and/or displayed on the remote desktop of VM 120, and other information.

The VDI agent 124 may also receive data from the VDI client 134 of the client device 104. For instance, user input generated by a user interacting with a peripheral 140 (e.g., mouse, keyboard) to control the virtual desktop on the VM 120 may be redirected to the VDI agent 124 via the VDI client 134.

The hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 118 or network 128. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via the network interface 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 128, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Figures 2A, 2B:
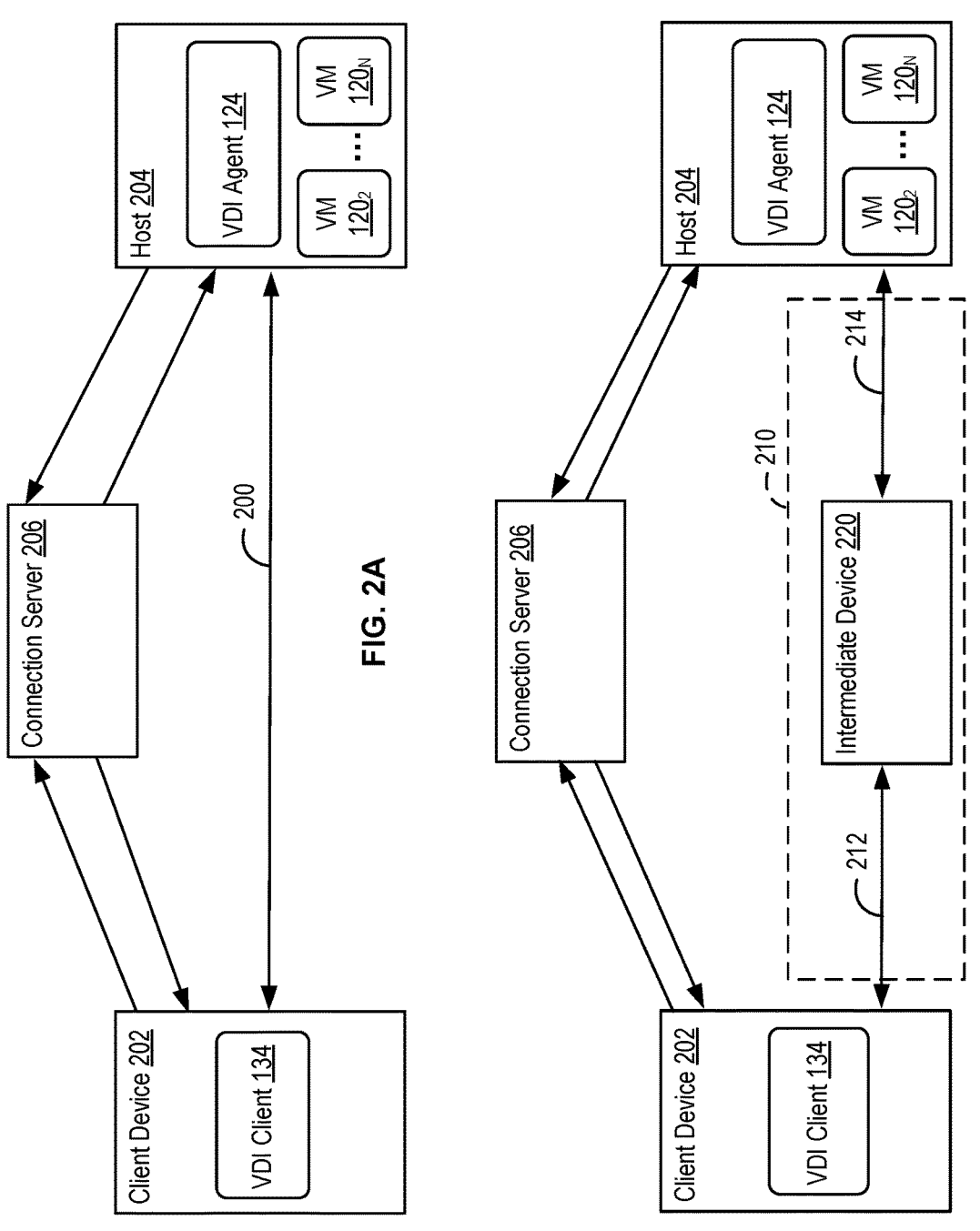
FIG. 2A illustrates a first RTC session between a client device and a remote device according to some embodiments of the present disclosure.
FIG. 2B illustrates a second RTC session between a client device and a remote device according to some embodiments of the present disclosure.

FIG. 2A illustrates a real-time communication (RTC) session 200 between a client device 202 (such as the client device 104 in FIG. 1) and a host 204 (such as one of the hosts 105 in FIG. 1) according to some embodiments of the present disclosure. The client device 202 may include the VDI client 134 and the host 204 may include the VDI agent 124 to facilitate communication of the remote display protocol. Additionally, the host 204 may include VMs 120.

As shown, the client device 202 and the host 204 may independently communicate (e.g, designated by arrows) with a connection server 206 to obtain authentication credentials (e.g., public IP address) needed to communicate with one another. As shown, in some embodiments, network configurations (e.g., client device 202 and host 204 are in same private network) may allow direct communications between the client device 202 and the host 204. In such embodiments, the RTC session 200 may be a direct communication link (e.g, denoted by double arrow between client device 202 and host 204) between the client device 202 and the host 204. In this manner, the client device 202 and the host 204 may, in contrast to conventional approaches, communicate with one another without a universal access gateway.

FIG. 2B illustrates another RTC session 210 between the client device 202 and the host 204 according to some embodiments of the present disclosure. As shown, the client device 202 and the host 204 may independently communicate (e.g, designated by arrows) with the connection server 206 to obtain authentication credentials (e.g., public IP address) needed to communicate with one another. As shown, in some embodiments, network configurations (e.g., client device 202 and host 204 are in different networks) may not allow direct communications between the client device 202 and the host 204. In such embodiments, the RTC session 210 may be established via an intermediate device 220 other than a unified access gateway. For instance, in some embodiments, the intermediate device 220 may be a Traversal Using Relays around Network address translation (TURN) server. In such embodiments, the RTC session 210 may include a first communication link 212 between the client device 202 and the intermediate device 220. The RTC session 210 may further include a second communication link 214 between the intermediate device 220 and the host 204.

It should be appreciated that the RTC session 200, 210 may facilitate transmission of the remote display protocol (e.g., VMware® Blast™) between the client device 202 and the host 204 (e.g., more specifically, the VDI agent 124 running on the host 204). Furthermore, as will be discussed later on in more detail, the host 204 may be configured to obtain data indicative of performance of the RTC session 200, 210 and may be further configured to adjust one or more parameters of the remote display protocol based, at least in part, on the data indicative of the performance of the RTC session 200, 210. More specifically, the host 204 may be configured to adjust the parameter(s) as needed to minimize a degradation in the quality of the virtual desktop as displayed by the client device.

Figure 3:
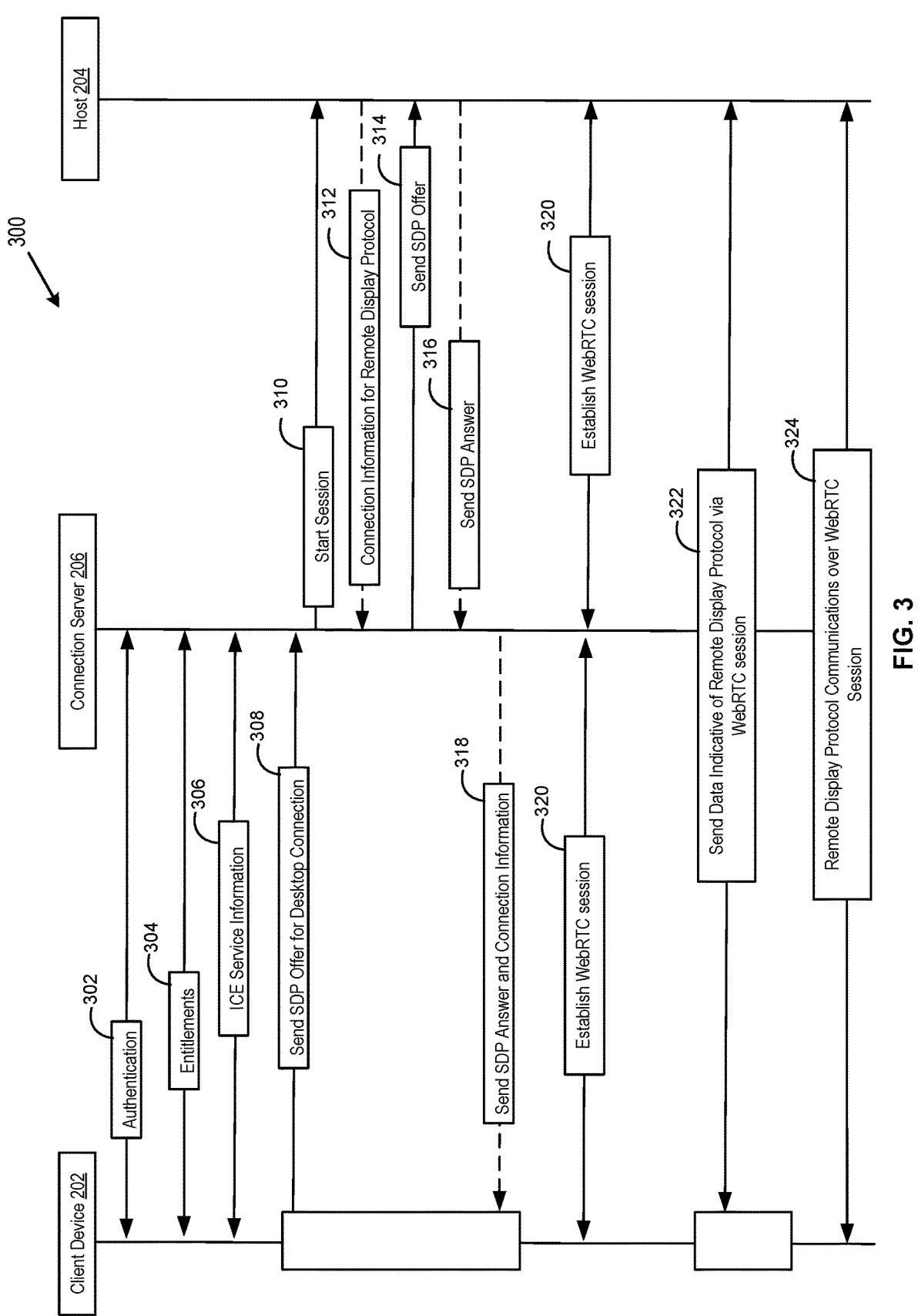
FIG. 3 illustrates a sequence diagram of a process for creating a real-time communication (RTC) session for delivery of a remote display protocol between a client device and a remote device according to some embodiments of the present disclosure.

FIG. 3 illustrates a sequence diagram 300 for establishing a RTC session between the client device 202 and the host 204 according to some embodiments of the present disclosure. In particular, the sequence diagram 300 is for establishing a WebRTC session based on the WebRTC protocol. It should be appreciated, however, that the scope of the present disclosure may cover RTC sessions established based on RTC protocols other than WebRTC.

At (302), the client device 202 may request authentication. More specifically, a user may input credentials (e.g., username and password) via a peripheral device (e.g, keyboard) that is communicatively coupled with the client device 202. The credentials may be provided to the connection server 206. In some embodiments, the user may input the credentials via a portal displayed on the client device 202.

At (304), the connection server 206 may determine entitlements of the client device 202 based, at least in part, on the authentication credentials provided at (302). In some embodiments, the entitlements may indicate whether the user is entitled to access the VDI agent 124 (FIG. 2) on the host 204. It should be appreciated the entitlements may vary from one user to another.

At (306), internet connectivity establishment (ICE) service information may be exchanged between the client device 202 and the connection server 206. For instance, the ICE service information may include information associated with facilitating a direct connection between the client device 202 and the host 204. Examples of such information may include, without limitation, one or more candidate public internet protocol (IP) addresses that may be used to reach the client device 202.

At (308), the client device 202 may communicate a source description protocol (SDP) offer for the host 204 to the connection server 206. It should be appreciated that, in some embodiments, the SDP offer may include data as required by the WebRTC protocol. For instance, the SDP offer may include a first section that is descriptive of the session, a second section that is descriptive of timing, and a third section that is descriptive of media to be transmitted during the session.

At (310), the connection server 206 may, in response to receiving the SDP offer from the client device 202, invite the host 204 to join a RTC session with the client device 202. At (312), the host 204 may communicate information to the connection server 206 in response to receiving the SDP offer at (310). For instance, in some embodiments, the information may include connection information for the remote display protocol.

At (314), the connection server 206 may communicate the SDP offer (e.g, the SDP offer generated at 308) to the host 204. For instance, in some embodiments, the host 204 may include a Web Proxy, and the connection server 206 may communicate the SDP offer to the Web Proxy. At (316), the host 204 may communicate a SDP answer to the connection server 206. For instance, in some embodiments, the Web Proxy of the host 204 may communicate the SDP answer to the connection server 206. It should be appreciated that, in some embodiments, the SDP answer may include data as required by the WebRTC protocol.

At (318), the connection server 206 may communicate a response to the client device 202. The response may include the SDP answer generated at (316) and the connection information generated at (312) for the remote display protocol.

At (320), a WebRTC session may be established between the client device 202 and the host 204. In some embodiments, the Web RTC session may, similar to the RTC session 200 discussed above with reference to FIG. 2A, be a direct communication link between the client device 202 and the host 204.

In alternative embodiments, a direct connection between the client device 202 and the host 204 may not be possible due to, for instance, network configurations. For instance, the client device 202 and the host 204 may be on separate networks that do not allow direct connections with external devices (e.g., devices outside the network). In such embodiments, the client device 202 and the host 204 may be connected to one another via the connection server 206 or another intermediate device (e.g, TURN server) other than a unified access gateway.

At (322), the client device 202 may communicate data indicative of the remote display protocol to the host 204 via the WebRTC session. More specifically, the data may, in some embodiments, be connection information associated with the remote display protocol. In some embodiments, the client device 202 may communicate the data indicative of the remote display protocol over a data channel of the WebRTC session. Furthermore, the client device 202 may communicate the data indicative of the remote display protocol over the data channel of the WebRTC session to the Web Proxy implemented on the host 204. The Web Proxy may be configured to establish a local connection (e.g., websocket or transmission control protocol) with virtual desktop controller that is configured to capture a state of the virtual desktop and communicate media data according to the remote display protocol and indicative of the state of the virtual desktop to the client device 202.

At (324), the remote display protocol may be implemented over the WebRTC session. For instance, in some embodiments, the client device 202 may communicate with the host 204, specifically the Web Proxy thereof, via the WebRTC session. Additionally, the Web Proxy may communicate with the module via the local connection.

Figure 4:
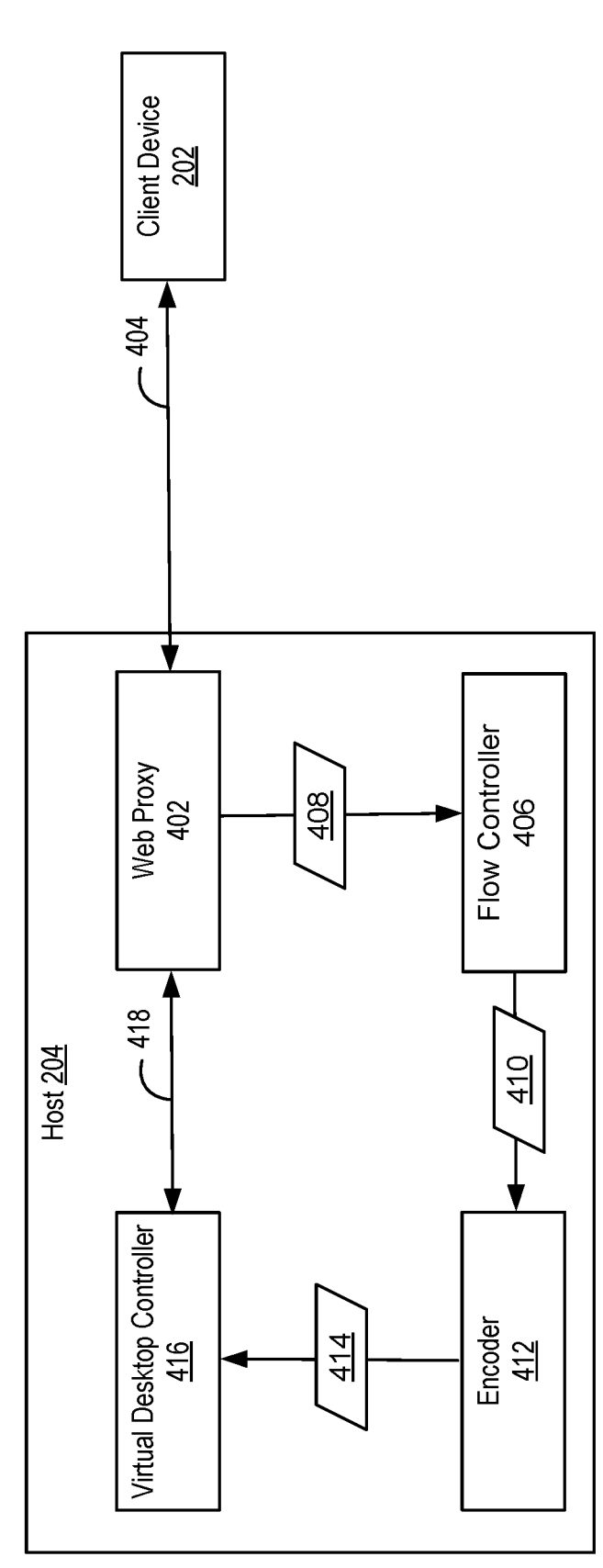
FIG. 4 is a block diagram illustrating components of a system for adjusting a remote display protocol based on data indicative of performance of a RTC session between a remote device and a client device according to some embodiments of the present disclosure.

FIG. 4 illustrates a system 400 for adjusting a remote display protocol for rendering a virtual desktop on a client device according to some embodiments of the present disclosure. The system 400 includes the client device 202 and host 204 discussed above with reference to FIGS. 2A, 2B, and 3. As shown, the host 204 may, in some embodiments, include a Web Proxy 402. The Web Proxy 402 may communicate with the client device 202 via a RTC session 404 (such as the RTC session 200 depicted in FIG. 2A or the RTC session 210 depicted in FIG. 2B).

The host 204 may include a flow controller 406. As shown, the flow controller 406 may be configured to receive data 408 from the Web proxy 402. The data 408 may be indicative of performance of the RTC session 404. For instance, in some embodiments, the RTC session 404 may be a WebRTC Session, and the data may be indicative of at least one of round trip time, fraction lost, and bandwidth estimation. The flow controller 406 may be configured to process the data 408 and output data 410 indicative of an adjustment to one or more parameters of the remote display protocol.

In some embodiments, the host 204 may include an encoder 412 to encode the data 410 output by the flow controller 406 and output encoded data 414. The host 204 may include a virtual desktop controller 416 that, as mentioned previously with reference to FIG. 3, is configured to capture a state of the virtual desktop and communicate media data according to the remote display protocol and indicative of the state of the virtual desktop. The virtual desktop controller 416 may receive the encoded data 414 from the encoder 412 and may adjust the media data according to the adjustment to parameter(s) of the remote display protocol prior to transmitting the media data to the client device 202 via the RTC session 404. In this manner, the remote display protocol can be dynamically adjusted according to performance of the RTC session 404 and can therefore minimize any degradation in the quality of the virtual desktop as rendered on the client device 202. For example, if data 408 indicates that the connection between the host 204 and the client device 202 is exhibiting poor performance (e.g., high latency, high round trip time, high fraction lost, low bandwidth estimation, and/or the like) then a frame rate, image resolution, or other parameter of the remote display protocol may be dynamically adjusted (e.g., reduced) in order to avoid lag, congestion, and/or the like.

As mentioned above with reference to FIG. 3, the virtual desktop controller 416 may be connected to the Web proxy 402 via a local connection 418. In some embodiments, the local connection may be a websocket connection. In alternative embodiments, the local connection may be a transmission control protocol (TCP) connection. In some embodiments, web proxy 402, flow controller 406, encoder 412, and virtual desktop controller 416 are components of VDI agent 124 on host 204.

FIG. 5 illustrates example operations 500 related to establishing a RTC session between a client device and a remote device executing a virtual desktop and communicating a remote display protocol via the RTC session according to some embodiments of the present disclosure. For example, operations 500 may be performed by one or more components of the remote device (such as one of the hosts 105 depicted in FIG. 1), such as the VDI agent 124 of FIG. 1.

Operation 502 includes receiving, at the remote device, a request to join a real-time communication (RTC) session with the client device. For instance, in some embodiments, the RTC session may be a WebRTC session. In such embodiments, the request received from the client device 104 may be a SDP offer which, as discussed above with reference to sequence diagram illustrated in FIG. 3, may include various data as required by the WebRTC protocol.

Operation 504 includes, in response to receiving the request to join the RTC session at Operation 502, joining the RTC session. In some embodiments, joining the WebRTC session may include multiple operations. For instance, as described above with reference to the sequence diagram 300 illustrated in FIG. 3, joining the RTC session may include sending connection information for the remote display protocol to a connection server. Joining the RTC session may also include sending a SDP answer to the connection server.

Operation 506 includes receiving, at the remote device and via the RTC session, data indicative of the remote display protocol from the client device. In some embodiments, the data indicative of the remote display protocol may include connection information to facilitate communication of the remote display protocol between the client device and remote device via the RTC session.

Operation 508 includes performing, at the remote device, one or more actions based, at least in part, on receiving data indicative of the remote display protocol at Operation 506. For instance, in some embodiments, the one or more actions may include communicating media data indicative of a current state of the virtual desktop to the client device for display thereon via the RTC session. Alternatively, or additionally, the one or more actions may include creating a local connection between a Web Proxy implemented on the remote device and a virtual desktop controller (also implemented on the remote device) that is configured to control operation of the virtual desktop. For instance, the virtual desktop controller may be configured to capture a state of the virtual desktop and communicate media data indicative of the state of the virtual desktop to the client device according to the remote display protocol implemented on the RTC session.

In some embodiments, the operations may further include obtaining data indicative of performance of the RTC session. For instance, in some embodiments, the remote device may include a flow controller configured to obtain data indicative of performance of the RTC session. The flow controller may process the data indicative of performance of the RTC session and may communicate an adjustment to one or more parameters (e.g., max number of frames per second, image resolution, and/or the like) of the remote display protocol to the virtual desktop controller. The adjustment to the parameter(s) of the remote display protocol may cause the virtual desktop controller to communicate the media data to the client device differently based, at least in part, on the adjustment to the parameter(s) of the remote display protocol.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices.—The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method comprising:

receiving, at a remote device configured to execute a virtual desktop, a request to join a real-time communication (RTC) session with a client device;

responsive to receiving the request, joining the RTC session with the client device;

receiving, at the remote device and via the RTC session, data indicative of a remote display protocol for rendering the virtual desktop on a display of the client device; and performing, at the remote device, one or more actions based, at least in part, on receiving the data indicative of the remote display protocol;

obtaining, at the remote device, data indicative of performance of the RTC session; and adjusting, at the remote device, one or more parameters associated with the remote display protocol based, at least in part, on the data indicative of performance of the RTC session.

2. The method of claim 1, wherein the data indicative of performance of the RTC session comprise at least one of (i) a round trip time; (ii) a fraction lost; or (iii) a bandwidth estimation.

3. The method of claim 1, wherein the RTC session comprises a WebRTC session.

4. The method of claim 3, wherein joining the WebRTC session comprises directly connecting to the client device.

5. The method of claim 3, wherein joining the WebRTC session comprises connecting to the client device via a Traversal Using Relays around Network address translation (TURN) server.

6. The method of claim 1, wherein the one or more actions comprise communicating media data to the client device via the RTC session, the media data indicative of a current state of the virtual desktop.

7. A system comprising:

at least one memory; and at least one processor coupled to the at least one memory, the at least one processor and the at least one memory configured to:

receive, at a remote device configured to execute a virtual desktop, a request to join a real-time communication (RTC) session with a client device;

responsive to receiving the request, join the RTC session with the client device;

receive, at the remote device and via the RTC session, data indicative of a remote display protocol for rendering the virtual desktop on a display of the client device; and perform, at the remote device, one or more actions based, at least in part, on receiving the data indicative of the remote display protocol;

obtain, at the remote device, data indicative of performance of the RTC session; and adjust, at the remote device, one or more parameters associated with the remote display protocol based, at least in part, on the data indicative of performance of the RTC session.

8. The system of claim 7, wherein the data indicative of performance of the RTC session comprise at least one of (i) a round trip time; (ii) a fraction lost; or (iii) a bandwidth estimation.

9. The system of claim 7, wherein the RTC session comprises a WebRTC session.

10. The system of claim 7, wherein joining the RTC session comprises directly connecting to the client device.

11. The system of claim 9, wherein joining the WebRTC session comprises connecting to the client device via a Traversal Using Relays around Network address translation (TURN) server.

12. The system of claim 7, wherein the one or more actions comprise communicating media data to the client device via the RTC session, the media data indicative of a current state of the virtual desktop.

13. A non-transitory computer-readable medium storing instructions that, when executed by one or more processors, cause the one or more processors to:

receive, at a remote device configured to execute a virtual desktop, a request to join a real-time communication (RTC) session with a client device;

responsive to receiving the request, join the RTC session with the client device;

receive, at the remote device and via the RTC session, data indicative of a remote display protocol for rendering the virtual desktop on a display of the client device; and perform, at the remote device, one or more actions based, at least in part, on receiving the data indicative of the remote display protocol;

obtain, at the remote device, data indicative of performance of the RTC session; and adjust, at the remote device, one or more parameters associated with the remote display protocol based, at least in part, on the one data indicative of performance of the RTC session.

14. The non-transitory computer-readable medium of claim 13, wherein the data indicative of performance of the RTC session comprise at least one of (i) a round trip time; (ii) a fraction lost; or (iii) a bandwidth estimation.

15. The non-transitory computer-readable medium of claim 13, wherein the RTC session comprises a WebRTC session.

16. The non-transitory computer-readable medium of claim 13, wherein joining the RTC session comprises directly connecting to the client device.

17. The non-transitory computer-readable medium of claim 15, wherein joining the WebRTC session comprises connecting to the client device via a Traversal Using Relays around Network address translation (TURN) server.

* * * * *